United States Patent [19]

Smith

[11] 4,088,410

[45] May 9, 1978

[54] OPTICAL SIZING INSTRUMENT

[75] Inventor: Francis Hughes Smith, York, England

[73] Assignee: Vickers Limited, Millbank, England

[21] Appl. No.: 658,719

[22] Filed: Feb. 17, 1976

[51] Int. Cl.² .................... G01B 11/02; G02B 27/14
[52] U.S. Cl. .................................. 356/163; 350/173; 350/174; 350/35
[58] Field of Search .................... 350/173, 174, 35; 356/156, 163, 106 R, 110, 113

[56] References Cited

U.S. PATENT DOCUMENTS

| | | | |
|---|---|---|---|
| 2,764,055 | 9/1956 | Clemens et al. | 356/106 R X |
| 2,857,804 | 10/1958 | Rantsch | 356/110 |
| 2,911,880 | 11/1959 | Rantsch | 356/110 |
| 3,068,743 | 12/1962 | Dyson | 356/163 |
| 3,288,021 | 11/1966 | Hopkins | 356/163 |
| 3,523,736 | 8/1970 | Bottomley | 356/156 |
| 3,652,167 | 3/1972 | Smith | 356/163 |

*Primary Examiner*—Jon W. Henry
*Attorney, Agent, or Firm*—Browdy and Neimark

[57] ABSTRACT

An optical image splitting apparatus is provided in which an image splitting surface capable of splitting an incident beam into first and second beams by transmission and reflection respectively is so arranged in relation to an uneven number of reflection surfaces that the two beams are reflected through respective paths in the apparatus and leave the apparatus in the same general direction. One of the reflection surfaces is common to the two paths and is deflectable to deflect the two paths in opposite angular directions in order to adjust the distance between the centers of the images formed from the two beams. The apparatus may include a device for blanking out one or other of the beams.

26 Claims, 5 Drawing Figures

OPTICAL SIZING INSTRUMENT

BACKGROUND OF THE INVENTION

The present invention relates to optical imagesplitting apparatus.

U.S. Pat. No. 3,652,167 in the name of Francis Hughes Smith describes an optical apparatus for measuring the lateral dimensions of objects by the procedure of image splitting, wherein the required dimension is obtained by adjusting the relative lateral displacement between two identical images of the object until the latter's relevant edges appear only just in contact.

However, experience has shown that the form of optical image-shearing systems described in the aforementioned specification presents substantial manufacturing difficulties. For example, the separate mirrors for the respective split images need separately adjusting to inconveniently precise limits and the orientations of the quarter-wave plates in front of the respective mirrors require careful adjustment to ensure that the split images have similar intensity.

SUMMARY OF THE INVENTION

The object of the present invention is to provide an improved optical image splitting apparatus.

According to the present invention there is provided an optical image-splitting apparatus comprising a beam splitting surface capable of splitting an incident beam into first and second beams by transmission and reflection respectively at the surface, and means defining an uneven plural number of reflection-surfaces arranged to reflect the first and second beams through respective paths whereby, in use, the first and second beams can emerge from the apparatus in substantially the same paths, at least one of the reflection-surfaces being common to the two paths and being deflectable to deflect the first and second paths in opposite angular directions to separate the paths whereby, in use, the distance between the centres of the images formed from the two beams can be adjusted.

In one embodiment of the reflection-surfaces are so arranged that, in use, the two beams travel in opposite directions about the same path before leaving the apparatus in the same general direction.

In a further embodiment the reflection-surfaces are so designed that an incident beam can be split into two beams which do not travel the same path so that one or other of the beams can be blanked out where desired.

In one arrangement both beams are reflected by an uneven number of plane reflection-surfaces back to the interface each at the side thereof opposite to the side at which it originally emerged from the interface. The beam which is initially reflected at the interface passes out of the image-splitting system by a second reflection at the opposite side of the same interface, whilst the initially transmitted beam passes out by a second transmission through the interface, both beams leaving via similar paths. Because of the eneven number of reflections experienced by both beams between first and second incidence at the interface, the angle included by their emerging paths is dependent upon the angles through which they have been intermediately reflected. Thus, the angular shear between the emerging beams can be adjusted by suitably tilting any one of the reflection-surfaces.

For a better understanding of the present invention and to show how it may be carried into effect reference will now be made by way of example, to the accompanying drawings.

BRIEF DESCRIPTION OF THE DRAWINGS

In the drawings:

FIG. 1 shows a binocular microscope comprising a conventional objective 1, an image splitting device 3 and a conventional binocular viewing head 4. The objective 1 is shown in a very simplified manner; the objective 1 would of course normally be a compound lens. The objective 1 has a standard Royal Microscopical Society mounting thread 2, and the exit pupil of the objective is at 5.

Figure 1:
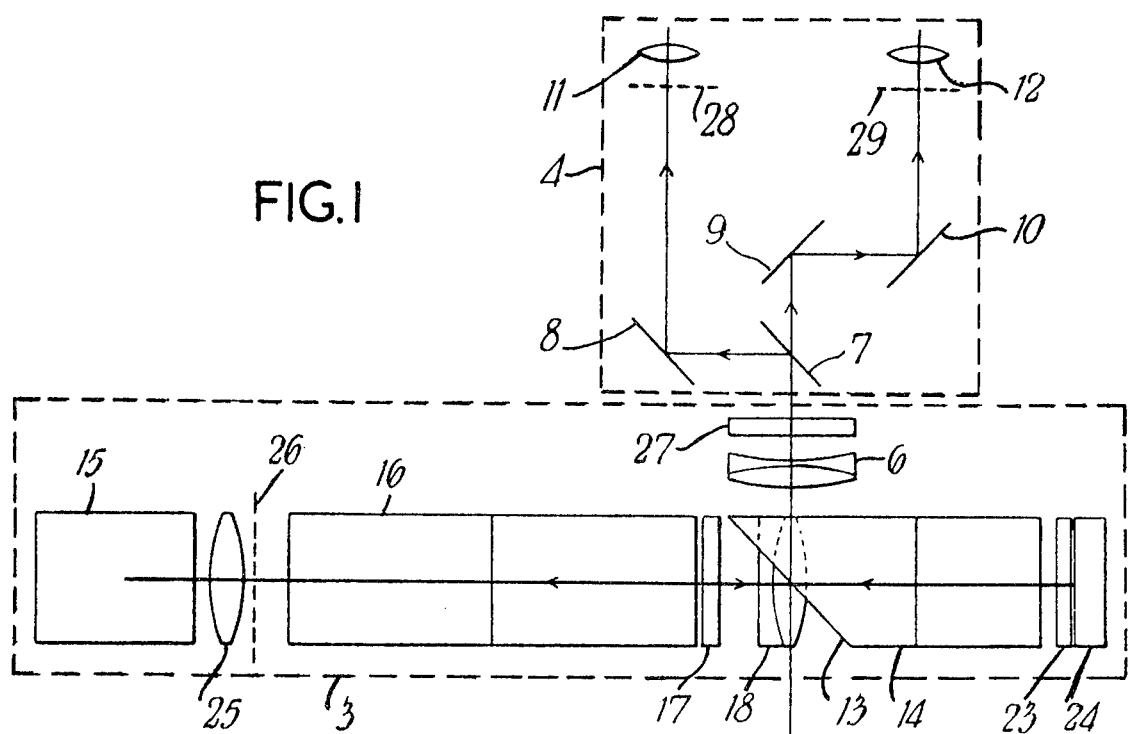
FIG. 1 shows diagrammatically an elevation of a optical system of a binocular microscope sought to be improved by the present invention.

The binocular viewing head 4 comprises the conventional arrangement of a beam divider made up of an interface 7 which transmits and reflects with equal intensities and three reflecting surfaces 8, 9 and 10, and two eyepieces 11 and 12. The eyepiece 11 has a focal plane 28 and the eyepiece 12 has a focal plane 29. These focal planes are coincident, so that the eyepieces have a common focal plane 28/29. Like the objective 1, the eyepieces 11 and 12 are shown in a very simplified manner and would in fact normally be compound lenses.

In summary, when the microscope shown in FIG. 1 is in use, a primary beam bearing an image of a field of view 30 passes vertically upwards through the objective 1 to an underside of a metallized surface 13, of prism 14, which reflects the beam into a horizontal looped path in which the beam is divided into two secondary beams as described below, the looped path terminating at the upper side of the surface 13 whereby the two secondary beams are discharged vertically into the binocular viewing head 4.

Figure 2:
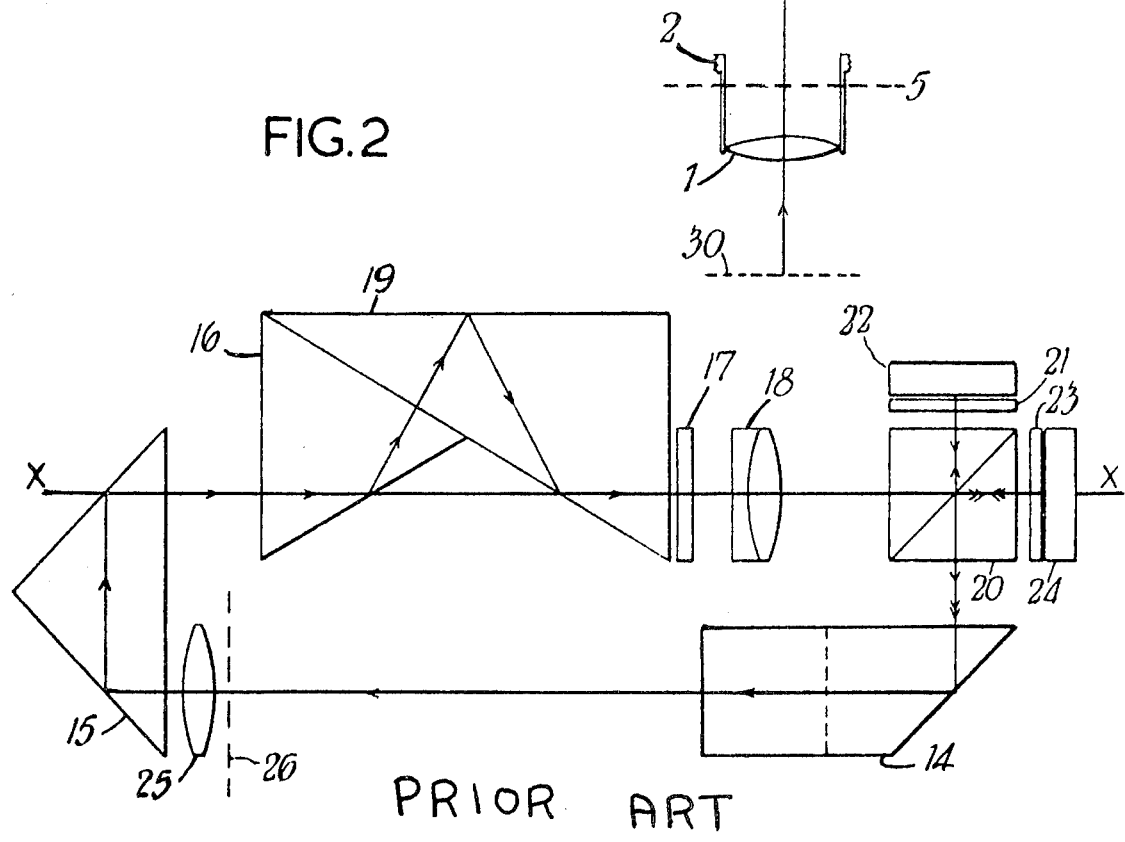
FIG. 2 shows a diagrammatic plan view of a part of the system of FIG. 1.

An effect of the objective on the primary beam is to focus the field of view at a point along the horizontal looped path thereby to form a primary orthoscopic image of the field of view in a plane 26 in the vicinity of a field lens 25. The effect of the field lens is to cause the orthoscopic image to converge as it passes through a Porro prism 15, a K-prism 16 and a quarter-wave retardation plate 17 until it reaches a field collimator 18, which collimates the orthoscopic image. The K-prism is a cemented assembly which has a metallized face 19 (FIG. 2) and which is mounted so as to be manually rotatable through 90° about the axis X—X shown in FIG. 2 between the position shown in FIG. 2 and a position in which the metallized face 19 occupies a horizontal plane vertically below the axis X—X. Having passed through the field collimator 18, the primary beam enters a Swan cube 20 (FIG. 2). At the plane interface of the Swan cube the beam is divided into the two secondary beams, one reflected and the other transmitted. The reflected beam (marked with a single arrow) passes from the cube through a quarter-wave retardation plate 21 and encounters a plane front surface mirror 22 which reflects the beam back through the plate 21 to the Swan cube interface which then finally transmits the beam out of the Swan cube. The transmitted beam (marked with a double arrow) passes from the cube through a quarter-wave retardation plate 23 and encounters a plane front surface mirror 24 which reflects the beam back through the plate 23 to the interface which then finally reflects the beam out of the Swan cube. The reflecting surfaces of the mirrors 22 and 24 lie in vertical planes inclined at right angles to one another. The interface of the Swan cube also lies in a vertical plane. Thus, the plane of the Swan cube interface intersects the planes of the reflecting surfaces of the mirrors 22 and 24 in two lines which are parallel to one another. The Swan cube is rotatable manually by micrometer-controlled mounting means (not shown) which may be of conventional type, relative to the mirrors 22 and 24 about a vertical axis which intersects the horizontal looped path at a central point of the Swan cube interface. The two mirrors are equidistant from the point of intersection. With the Swan cube in the illustrated orientation, with respect to the mirrors 22 and 24, the transmitted beam and the reflected beam recombine at the interface and there is no image splitting. However, if the Swan cube is rotated through a small angle about its axis of rotation the transmitted beam and the reflected beam do not recombine at the interface and, on finally leaving the Swan cube, the two secondary beams are spaced from one another and appear, immediately downstream of the Swan cube, to be mutually divergent from the reflecting surface of the mirror 22 (by saying that the two secondary beams are "spaced" from one another, it is meant that the central axes of the two beams are spaced from one another). The angle by which the two secondary beams diverage from one another depends on the angle through which the Swan cube is rotated from its illustrated orientation.

The secondary beams leaving the Swan cube encounter a vertical reflecting face of the prism 14 whereby the beams are reflected to the upper side of the metallized surface 13, which reflects the beam into a vertical plane. The vertically travelling beams pass through a telescope objective 6 and a thick quartz plate 27 before entering the binocular viewing head 4. The telescope objective 6 focuses the collimated images of the field of view into the common focal plane 28/29 of the two eyepieces 11 and 12 so that secondary real images are formed in that plane. These images are viewed through the eyepieces in conventional manner, and the image-splitting method of measuring the diameter of an object in the field of view can accordingly be employed, the aforesaid micrometer controlled mounting means being appropriately calibrated in conventional manner.

In addition, the exit pupil of the microscope objective 1 serves as an object for the field lens 25 which converges the image of the exit pupil towards a position beyond the mirror 24. The field collimator converges the exit pupil further, to bring it to a focus at the reflecting surface of the mirror 24. By virtue of the fact that the interface of the Swan cube is partly reflecting, the reflecting surface of the mirror 24 is in an optically equivalent position to that of the reflecting surface of the mirror 22 and accordingly the exit pupil is really imaged by the lens 25 and the field collimator 18 at a point that is optically equivalent to the point from which the two secondary beams appear, immediately downstream of the Swan cube, to be mutually divergent. By virtue of the fact that the image of the exit pupil is a point optically equivalent to that from which the two secondary beams appear to be mutually divergent there is no exit pupil splitting.

The function of the three quarter-wave retardation plates 71, 21 and 23 is to enchance the light transmission and reduce veiling glare due to air-glass reflections. Oblique incidence at the partially reflecting interface of the Swan cube 20 gives rise to strong polarization. For example the beam which is initially reflected by the interface leaves the cube with its strongest electrical vibration perpendicular to the plane of incidence on the interface. In order to ensure maximum transmission when this beam returns through the interface, its outgoing vibration direction is rotated through 90° by virtue of double transmission through the quarter-wave plate 20, which is diagonally oriented. The beam which is initially transmitted by the interfaces leaves the cube with its strongest electrical vibration in the plane of incidence on the interface and in order to ensure maximum reflection when this beam returns to the interface, its outgoing vibration direction is rotated through 90° by virtue of double transmission through the quarter-wave plate 23, which is also diagonally oriented. The purpose of the plate 17 is to ensure that the secondary beams transmitted and reflected by the interface have equal amplitude regardless of the state of polarization of the primary beam. The plate 17 is also diagonally oriented and so circularly polarizes components of the primary beam polarized in and perpendicular to the plane of incidence at the interface of the cube. The thick quartz plate 27 is required because the two secondary beams leave the Swan cube partially polarized in mutually perpendicular planes and the beam-splitting interface 7 exerts a partial analyzing action on the two secondary beams so that without the plate 27 the two secondary beams would be transmitted and reflected by the interface 7 with different intersities. Such difference of intensities impairs the accuracy of settings made on rotating the Swan cube and the plate 27 is provided to mitigate this effect. Ideally, the plate 27 circularly polarizes the two secondary beams so that they are transmitted and reflected by the interface 7 with equal intensities. A further quarter-wave retardation plate may be used instead of the thick quartz plate 27.

The image-splitting device 3 may conventiently be constructed in the form of a module interposed between the objective and the viewing head of a binocular microscope. The module could be used with different objectives, each positioned as nearly as is practicable with its exit pupil at the preselected position 5 in relation to the module 3. A useful degree of avoidance of exit-pupil splitting may be obtained even if the exit pupil of a particular objective cannot be placed precisely at the position 5. Thus the module could usefully be marketed as a separate item, for use in conjunction with binocular viewing heads and objectives already available.

Suitable a module may in fact also be used with a monocular viewing head, but in such a case the thick quartz plate 27 (or the alternative further quarter-wave plate) would not be required.

In the device 3 the Swan cube is rotatable about a vertical axis with respect to the rest of the device. Alternatively, a device could be constructed in which the Swan cube remains stationary while the two front surface mirrors are rotated together about a vertical axis.

In such a case the two component beams again emerge from the Swan cube at a relative inclination dependent upon the inclination of the interface of the Swan cube with respect to the front surface mirrors.

The provision of the rotable K-prism in the illustrated arrangement is not an essential feature in the microscope has a conventional rotating stage, but it is a strongly preferred feature because by rotation of the K-prism the secondary real images viewed through the eyepiece can be rotated about one another, permitting different diameters of an object in the field of view to be measured without toucing the object itself.

DESCRIPTION OF PREFERRED EMBODIMENTS OF THE INVENTION

Figure 3:
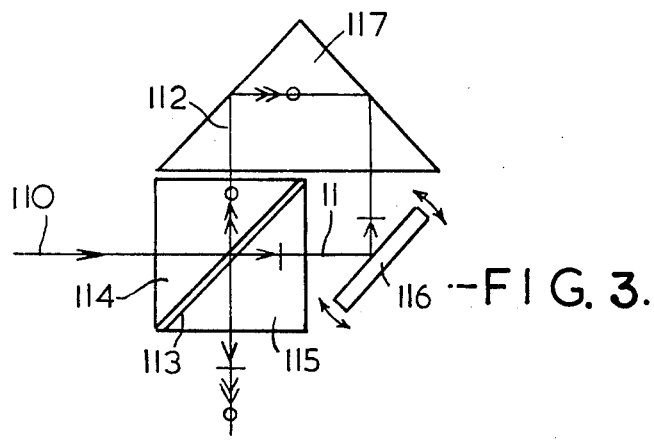
FIG. 3 is a sketch in plan view of an apparatus according to the present invention.
Figure 4:
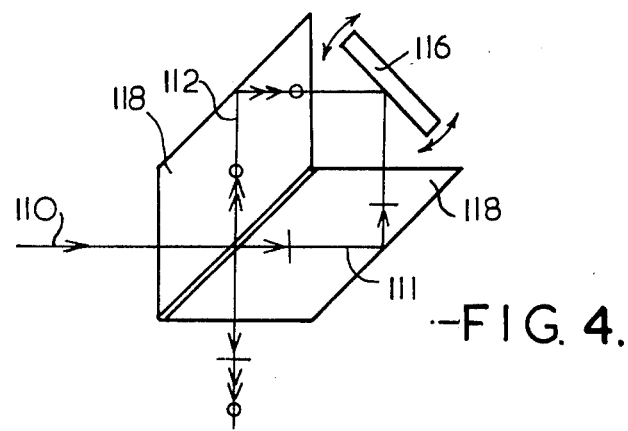
FIG. 4 is a sketch in plan view of a further apparatus to the invention showing the ray paths of the split beams when the beam image is introduced centrally in to the apparatus, and, FIG. 5 is an apparatus similar to FIG. 2 showing the ray paths of the split beams when the beam image is introduced into the apparatus off-centre.
Figure 5:
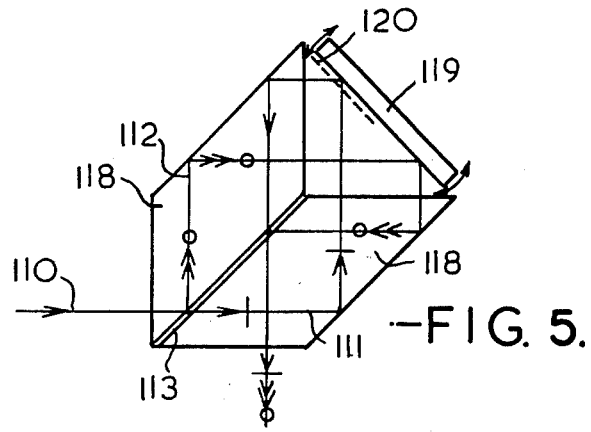

FIGS. 3–5 illustrate respective embodiments of image splitting apparatus which are used to replace the structure of FIGS. 1 and 2 constituted by Swan cube 20, the plate 21, the mirror 22, the plate 23 and the front surface mirror 24 in accordance with the present invention. In FIG. 3 an incoming image bearing beam 110 is split into two beams 111 and 112 by transmission and reflection respectively at polarizing beam-splitting coatings on the diagonal cemented interface 113 between the two prisms 114 and 115 forming a cube. The transmitted beam 111 (represented by the single-barbed ray) has its electrical vibration parallel to the plane of the figure and passes round a looped path in a counter-clockwise direction to the opposite side of the polarizing interface 113 where it is again transmitted and passes out of the apparatus to the viewable image plane (not shown). The initially reflected beam 112, on the other hand, passes round the same looped path but in a clockwise direction, its electrical vibrations being perpendicular to the plane of the figure. It returns on the opposite side of the polarizing interface 113 where it is reflected out of the apparatus towards the final image plane. It is apparent that both beams undergo three reflections during their journey round the loop, viz, one at a tiltable mirror 116 and two inside a Porro prism 117. Because of this uneven number of reflections, application of tilt to the mirror 116 about an axis perpendicular to the figure imparts opposite angular displacements to the two beams 111 and 112, thus providing the required angular shear.

In the, presently preferred, arrangement represented by FIG. 4 the same number of reflections is achieved by replacing the cube and Porro prism of FIG. 3 with a pair of cement rhomboid prisms 118. Again, the cemented interface bears dielectric, polarizing coatings which linearly polarise the two beams in mutually perpendicular directions.

It is often desirable when using image-splitting apparatus to extinguish the second image so as to permit conventional examination of the object. Although in principle this can be achieved by adjusting the shear to zero, so that both images precisely coincide, this is obviously inconvenient and it is preferred to eliminate one beam without re-setting the shear adjustment. In the systems illustrated by FIGS. 3 and 4 both beams pass round the loop along virtually coincidental paths so that any attempt to mask out one beam necessarily also masks out the other. However, since the emergent beams are linearly polarized at right angles to each other the required discriminatory isolation of one beam can be achieved by intercepting both beams with a polarizing filter having its vibrations direction perpendicular to the vibration direction of the beam which is to be suppressed.

This method requires good quality dielectric polarizing layers at the cemented interface, a requirement which can be avoided by the lay-out indicated by FIG. 5. As can be seen, the geometry of the optical components is essentially the same as that presented by FIG. 4 but the incident beam enters the apparatus laterally displaced from the imaginary centre line. This causes the two counter-travelling beams to be separated in the space between the prisms 118 and a mirror 119, equivalent to the mirror 116, so that a shutter interposed where shown by the broken line at 120 has the required effect of blocking one beam and not the other.

While preferred embodiments of the invention have been described it will be appreciated that the apparatus can be modified beyond what is described without falling outside the scope of the appended claims.

What is claimed is:

1. An improved optical sizing instrument of the kind comprising:
  (i) a binocular viewing head having a beam divider and two eyepieces for viewing respective intermediate real images, of a field of view under investigation, formed at a common focal plane thereof;
  (ii) an objective arranged to form a primary real image, of the field of view, at a first position upstream of the said common focal plane;
  (iii) an image-splitting device arranged between the objective and the binocular viewing head for splitting a primary light beam, received from the objective, into first and second secondary image-bearing beams which, downstream of the said device, are spaced from one another by a distance which is selectively variable by adjustment of the said device;
  (iv) first optical imaging means mounted downstream of the objective, but upstream of the said device for forming a real image of the obective's exit pupil at a point optically equivalent to a point from which the said two secondary beams appear, immediately downstream of the said device, to be mutually divergent; and
  (v) second optical imaging means mounted downstream of the said device and the said first position, but upstream of the said common focal plane, for bringing to a focus at the common focal plane the images of the field of view that are borne respectively by the said two secondary beams; wherein the improvement resides in that the image-splitting device comprises a beam splitting surface for splitting the incident said primary light beam into the said first and second secondary beams by transmission and reflection respectively at the said surface, and means defining an uneven plural number of reflection-surfaces arranged to reflect the said first and second secondary beams through respective first and second paths which return the secondary beams to the beam splitting surface whereby the said first and second secondary beams can emerge from the said device in substantially the same path, one of said reflection-surfaces being common to said first and second paths and being deflectable to deflect said first and second paths in opposite angular directions to separate said paths to adjust the said distance between the said two secondary beams.

2. An instrument according to claim 1, wherein said reflection-surfaces are so arranged that, at one position of said deflectable reflection-surface said two secondary beams can travel in opposite directions about the same path before leaving the apparatus.

3. An instrument according to claim 1, wherein said device includes means for blanking out one of said first and second secondary beams.

4. An instrument according to claim 3, wherein said device is so designed that said first and second secondary beams are linearly polarized at right angles to one another, and said blanking means comprises a polarizing filter having its vibration direction perpendicular to the vibration direction of the beam that is to be blanked.

5. An instrument according to claim 1, wherein two of said reflection-surfaces are provided by faces of respective rhomboid prisms, said beam splitting surface being formed by a cemented interface between said prisms.

6. An instrument according to claim 1, wherein said beam splitting surface is provided with a dielectric polarizing coating.

7. An instrument according to claim 1, wherein the image-splitting device, the first optical image means and the second optical imaging means are parts of an exchangeable module mounted in the instrument between the objective and the binocular viewing head.

8. An instrument according to claim 7, wherein the exchangeable module further includes prism means mounted upstream of the said group, but downstream of the field lens, for rotation about the primary beam so as to rotate the images formed in the said common focal plane from the two secondary beams.

9. For use in an optical sizing instrument of the kind comprising an objective and a binocular viewing head having a beam divider and two eyepieces for viewing respective intermediate real images of a field of view, formed at a common focal plane thereof by means of the objective, an improved module of the type adapted to be arranged between the objective and the binocular viewing head and having
   (i) an image-splitting device for splitting a primary light beam received from the objective into first and second secondary image-bearing beams which, downstream of the image-splitting device, are spaced from one another by a distance which is selectively variable by adjustment of the image-splitting device;
   (ii) first optical imaging means mounted upstream of the image-splitting device for forming a real image of the objections exit pupil at a point optically equivalent to a point from which the two said secondary beams appear, immediately downstream of the image-splitting device, to be mutually divergent; and
   (iii) second optical imaging means mounted downstream of the image-splitting device for bringing to a focus at the said common focal plane the images of the field of view that are borne respectively by the said two secondary beams; wherein the improvement resides in that the image-splitting device comprises a beam splitting surface for splitting the incident said primary light beam into the said first and second secondary beams by transmission and reflection respectively at the said surface, and means defining an uneven plural number of reflection-surfaces arranged to reflect the said first and second secondary beams through respective first and second paths which return the secondary beams to the beam splitting surface whereby the said first and second secondary beams can emerge from the said device in substantially the same path, one of said reflection-surfaces beng common to said first and second paths and being deflectable to deflect said first and second paths in opposite angular directions to separate said paths to adjust the said distance between the said two secondary beams.

10. A module according to claim 9, wherein said reflection surfaces are so arranged that, at one position of said deflectable reflection-surface said two secondary beams can travel in opposite directions about the same path before leaving the apparatus.

11. A module according to claim 9 wherein said device includes means for blanking out one of said first and second secondary beams.

12. A module according to claim 11 wherein said device is so designed that said first and second secondary beams are linearly polarized at right angles to one another, and said blanking means comprises a polarizing filter having its vibration direction perpendicular to the vibration direction of the beam that is to be blanked.

13. A module according to claim 9, wherein two of said reflection-surfaces are provided by faces of respective rhomboid prisms, said beam splitting surface being formed by a cemented interface between said prisms.

14. A module according to claim 9, wherein said beam splitting surface is provided with a dielectric polarizing coating.

15. An improved optical sizing instrument of the kind comprising:
   (i) eyepiece means for viewing a field of view under investigation imaged at a focal plane of the eyepiece means;
   (ii) an objective arranged to form a primary real image, of the field of view, at a first position upstream of the said focal plane;
   (iii) an image-splitting device arranged between the objective and the binocular viewing head for splitting a primary light beam, received from the objective, into first and second secondary image-bearing beams which, downstream of the said device, are spaced from one another by a distance which is selectively variable by adjustment of the said device;
   (vi) first optical imaging means mounted downstream of the objective, but upstream of the said device for forming a real image of the objective's exit pupil at a point optically equivalent to a point from which the said two secondary beams appear, immediately downstream of the said device, to be mutually divergent; and
   (v) second optical imaging means mounted downstream of the said device and the said first position, but upstream of the said focal plane, for bringing to a focus at the focal plane the images of the field of view that are borne respectively by the said two secondary beams; wherein the improvement resides in that the image-splitting device comprises a beam splitting surface for splitting the incident said primary light beam into the said first and second secondary beams by transmission and reflection respectively at the said surface, and means defining an uneven plural number of reflection-surfaces arranged to reflect the said first and second secondary beams through respective first and second paths which return the secondary beams to the beam splitting surface whereby the said first and second secondary beams can emerge from the said device in substantially the same path, one of said reflection-surfaces being common to said first and second paths and being deflectable to deflect said first and second paths in opposite angular directions to separate said paths to adjust the said distance between the said two secondary beams.

16. An instrument according to claim 15 wherein said reflection-surfaces are so arranged that, at one position of said deflectable reflection-surface said two secondary beams can travel in opposite directions about the same path before leaving the apparatus.

17. An instrument according to claim 15, wherein said device includes means for blanking out one of said first and second secondary beams.

18. An instrument according to claim 17, wherein said device is so designed that said first and second secondary beams are linearly polarized at right angles to one another, and said blanking means comprises a polarizing filter having its vibration direction perpendicular to the vibration direction of the beam that is to be blanked.

19. An instrument according to claim 15, wherein two of said reflection-surfaces are provided by faces of respective rhomboid prisms, said beam splitting surface being formed by a cemented interface between said prisms.

20. An instrument according to claim 15, wherein said beam splitting surface is provided with a dielectric polarizing coating.

21. For use in an optical sizing instrument of the kind having an objective and eyepiece means for viewing a field of view imaged by means of the objective at a focal plane of the eyepiece means, an improved module of the type adapted to be arranged between the objective and the eyepiece means and having (i) an image-splitting device for splitting a primary light beam received from the objective into first and second secondary image-bearing beams which, downstream of the image-splitting device, are spaced from one another by a distance which is selectively variable by adjustment of the image-splitting device;

(ii) first optical imaging means mounted upstream of the image-splitting device for forming a real image of the objective's exit pupil at a point optically equivalent to a point from which the two said secondary beams appear, immediately downstream of the image-splitting device, to be mutually divergent; and (iii) second optical imaging means mounted downstream of the image-splitting device for bringing to a focus at the said focal plane the images of the field of view that are borne respectively by the said two secondary beams; wherein the improvement resides in that the image-splitting device comprises a beam splitting surface for splitting the incident said primary light beam into the said first and second secondary beams by transmission and reflection respectively at the said surface, and means defining an uneven plural number of reflection-surfaces arranged to reflect the said first and second secondary beams through respective first and second paths which return the secondary beams to the beam splitting surface whereby the said first and second secondary beams can emerge from the said device in substantially the same path, one of said reflection-surfaces being common to said first and second paths and being deflectable to deflect said first and second paths in opposite angular directions to separate said paths to adjust the said distance between the said two secondary beams.

22. A module according to claim 21, wherein said reflection-surfaces are so arranged that, at one position of said deflectable reflection-surface said two secondary beams can travel in opposite directions about the same path before leaving the apparatus.

23. A module according to claim 21, wherein said device includes means for blanking out one of said first and second secondary beams.

24. A module according to claim 23, wherein said device is so designed that said first and second secondary beams are linearly polarized at right angles to one another, and said blanking means comprises a polarizing filter having its vibration direction perpendicular to the vibration direction of the beam that is to be blanked.

25. A module according to claim 21, wherein two of said reflection surfaces are provided by faces of respective rhomboid prisms, said beam splitting surface being formed by a cemented interface between said prisms.

26. A module according to claim 21, wherein said beam splitting surface is provided with a dielectric polarizing coating.

* * * * *